United States Patent [19]
Thomas

[11] Patent Number: 6,068,100
[45] Date of Patent: May 30, 2000

[54] METHOD FOR FORMING A REPLACEABLE ROLL COVERING AND APPARATUS

[76] Inventor: Wilbur C. Thomas, 8 Clinton La., Dearborn, Mich. 48120

[21] Appl. No.: 09/065,846

[22] Filed: Apr. 22, 1998

[51] Int. Cl.⁷ .................................................... B65G 13/00
[52] U.S. Cl. ................................................ 193/37; 492/48
[58] Field of Search ...................... 193/35 R, 37; 198/780; 492/28, 48

[56] References Cited

U.S. PATENT DOCUMENTS

| | | | |
|---|---|---|---|
| 4,926,995 | 5/1990 | Kaufman | 193/37 |
| 5,139,134 | 8/1992 | Schenck | 193/37 X |

*Primary Examiner*—James R. Bidwell
*Attorney, Agent, or Firm*—Harness, Dickey & Pierce, P.L.C.

[57] ABSTRACT

A roll assembly is disclosed having a roll, a carrier strip secured to the roll, and a replaceable cover strip adhesively bonded to the carrier strip. Upon removal of the cover strip, the adhesive bond causes a portion of the carrier strip to be pulled away with the cover strip. A replacement cover strip can then be adhesively bonded to the newly exposed surface of the carrier strip.

18 Claims, 1 Drawing Sheet

METHOD FOR FORMING A REPLACEABLE ROLL COVERING AND APPARATUS

BACKGROUND OF THE INVENTION

1. Technical Field

The present invention relates generally to rolls of the type used in roller conveyors and, more particularly, to a roll assembly having a replaceable roll covering.

2. Discussion

As is known, roller conveyors are used in material handling systems for moving objects from one location to another. Conventional roller conveyors include a series of rolls that are rotatably supported from a rigid frame structure. Typically, the rolls have an elongated cylindrical body segment which is mounted between a pair of frame rails. The cylindrical body segment of the roll can be journalled on a support shaft extending between the frame rails or, in the alternative, can have integral end shafts that are supported in anti-friction bearings mounted in the frame rails. Regardless of the roll type, it is also known to provide a layer of a cover material (i.e., rubber, urethane, etc.) on the outer surface of the cylindrical body segment. The cover layer functions to minimize potential damage to the objects caused by contact with the rolls while concurrently assisting in the frictional movement of the objects on the rolls. Irrespective of the type of material used for the cover layer, its outermost contact surface will ultimately wear and thus necessitate replacement of the roll from the conveyor. Once the roll is removed from the conveyor it is either discarded or refurbished by stripping the old cover layer and subsequently bonding a new cover layer on the roll. As is obvious, this refurbishing process is both labor intensive and expensive.

In an effort to minimize the costs associated with replacing and/or repairing worn-out rolls, it has previously been proposed to install a replaceable cover strip on the body segment of the roll. Typically, hook and loop materials, such as Velcro®, and other analogous latch-type fastener products, have been used to releasably secure the cover strip to the body segment of the roll. In such arrangements, a mounting strip is permanently secured to the outer surface of the roll's body segment and is adapted to receive the replaceable cover strip to which the cover layer is bonded. However, these releasable latch-type mounting arrangements have proven to have limited functional utility. In particular, since the contact interface defined between the interdigitated latching projections on the mounting strip and the cover strip is irregular and of low density, the weight of the objects supported on the rolls may tend to cause undesirable radial and/or circumferential deformation of the cover strip. Thus, a need exists to develop an improved roll covering, and a method for installing and replacing the roll covering on a conveyor roll, which overcomes the shortcomings of the prior art.

SUMMARY OF THE INVENTION

Accordingly, it is an object of the present invention to provide a roll assembly comprised of a roll, a carrier strip adapted to be secured to the roll, and a replaceable cover strip adapted to be adhesively bonded to the carrier strip. When it is desired to remove the cover strip from the roll assembly, the cover strip is stripped from the carrier strip such that the adhesive causes a portion of the carrier strip to be pulled away with the cover strip. As such, the newly exposed surface of the carrier strip is then prepared to have a replacement cover strip adhesively bonded thereto.

A related object of the present invention is to provide a replaceable cover strip for the roll assembly which includes a substrate layer having an inner surface adapted to be adhesively bonded to the carrier strip, and an outer surface to which a cover layer is bonded.

As a further object, the cover strip for the roll assembly of the present invention includes an adhesive layer having an inner surface bonded to the inner surface of the substrate layer and an outer surface capable of being activated for bonding to the carrier strip.

It is a further object to provide a carrier strip for the roll assembly of the present invention which includes a base layer having an inner surface adapted to be adhesively bonded to the outer surface of the roll, and an outer surface to which the base layer of the cover strip is adhesively bonded.

As a related object, the base layer of the carrier strip is made from a friable and/or peelable material that will release (i.e., slough-off or shed) a thin skin portion of the friable material in response to delaminating the adhesive bond between the adhesive layer of the cover strip and the base layer of the carrier strip.

As a further object, the adhesive bond between the roll and the carrier strip has greater strength than the adhesive bond between the cover strip and the carrier strip to permit removal of the cover strip from the roll when replacement is required.

Accordingly, the roll assembly of the present invention provides a replaceable roll covering for rolls used in roller conveyors and is further directed to methods of installing and removing the replaceable roll covering.

DETAILED DESCRIPTION OF THE INVENTION

In general, the present invention is directed to a replaceable roll covering for a roll that can be used in virtually any type of material handling system or analogous application. Specifically, a roll covering is disclosed which includes a carrier strip secured to a roll and a replaceable cover strip adhesively bonded to the carrier strip. Removal of the cover strip functions to remove a surface portion of the carrier strip, thereby exposing a new surface which is then ready for receipt of a replacement cover strip. While the following is described in conjunction with a roller conveyor, the roll assembly of the present invention can be used in any other roller applications.

Figure 1:
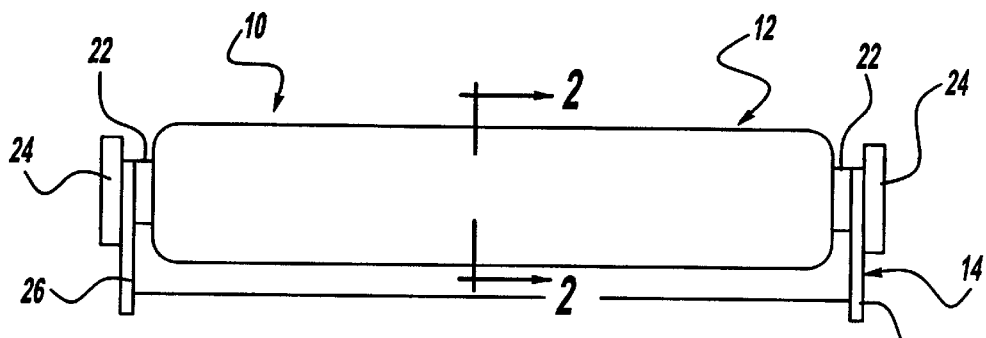
FIG. 1 shows a portion of an exemplary roller conveyor equipped with the roll assembly of the present invention.
Figure 2:
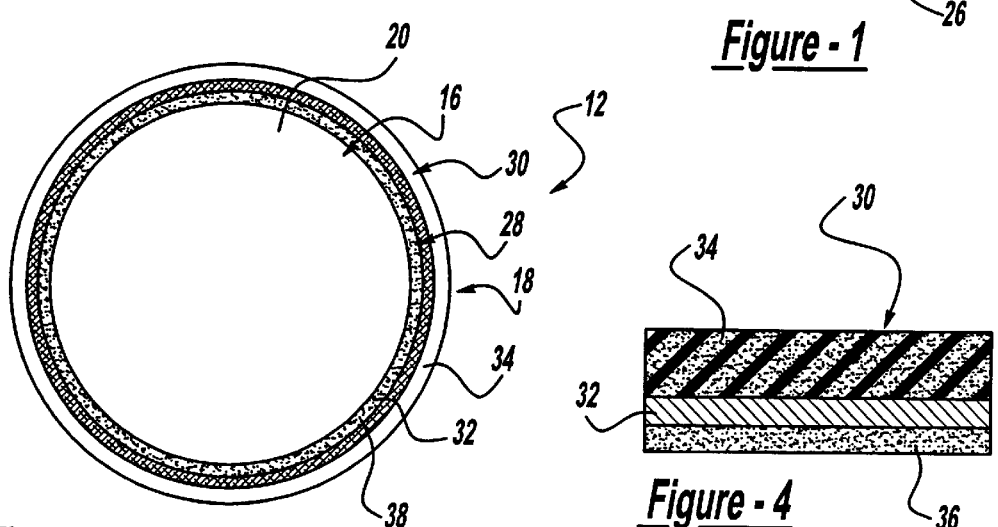
FIG. 2 is an enlarged sectional view taken generally along line 2—2 of FIG. 1.

Referring to the drawings, a portion of a roller conveyor 10 is shown in FIG. 1 to include a roll assembly 12 supported for rotation from a frame structure 14. Roll assembly 12 includes a roll 16 and a roll covering 18. Roll 16 includes an elongated cylindrical body segment 20 on which roll covering 18 is installed and a pair of axle shafts 22 extending coaxially from opposite ends of body segment 20. Axle shafts 22 are rotatably supported in an otherwise conventional manner, such as by bearing blocks 24, from between a pair of laterally-spaced frame rails 26 of frame structure 14. Roll covering 18 provides a wear surface between body segment 20 of roll 16 and objects engaging roll covering 18 that are transported in response to rolling motion of roll 16.

Referring now primarily to FIG. 2 through 5, roll covering 18 will now be described in greater detail. In general, roll covering 18 includes a carrier strip 28 secured to body segment 20 of roll 16, and a cover strip 30 secured to carrier strip 28. Cover strip 30 is replaceable in that, when the existing cover strip is worn and requires replacement, it may be stripped from carrier strip 28. Such removal of a worn-out cover strip causes a surface portion of the carrier strip to be released with the cover strip to expose a new surface to which a replacement cover strip is secured. Thus, a plurality of replacement cover strips can be sequentially installed and removed from the carrier strip prior to necessitating replacement of the carrier strip thereby providing a quick and cost effective system for refurbishing roll assemblies.

Figure 4:
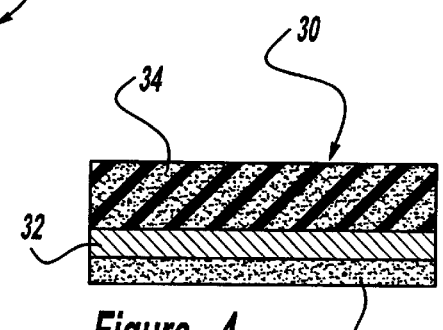
FIG. 4 is a sectional view of the cover strip.

According to a preferred construction for roll covering 18, cover strip 30 is, as shown in FIG. 4, a laminated assembly comprised of a substrate layer 32 that is anchored to a cover layer 34. Cover layer 34 is made of a resilient material such as, for example, natural or synthetic rubber. Other materials for use with cover layer 34 include rubber, urethane, polyester, vinyl, synthetic rubber, synthetic fibers, fiberglass, polymeric material or light gauge metal. Substrate layer 32 is made of dacron or cotton. Preferably, cover layer 34 is adhesively bonded to substrate layer 32 using any conventional adhesive capable of providing the requisite bond strength to avoid delamination during use of roll assembly 12. To accommodate the step of securing cover strip 30 to carrier strip 28, an adhesive layer 36 is shown therebetween. If applied as a liquid, adhesive layer 36 can be applied directly to substrate layer 32 or carrier strip 28 prior to anchoring of cover strip 30 to carrier strip 28. In the alternative, adhesive layer 36 can be an adhesive film or double-sided tape, such as a transferable film acrylic, mounted to substrate layer 32 and which can be activated when cover strip 30 is to be secured to carrier strip 28.

Figure 5:
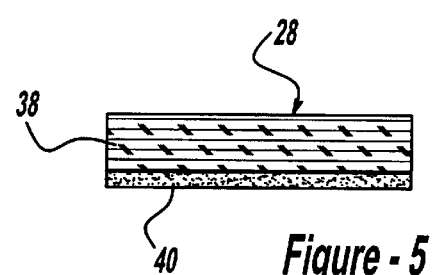
FIG. 5 is a sectional view of the carrier strip.
Figure 3:
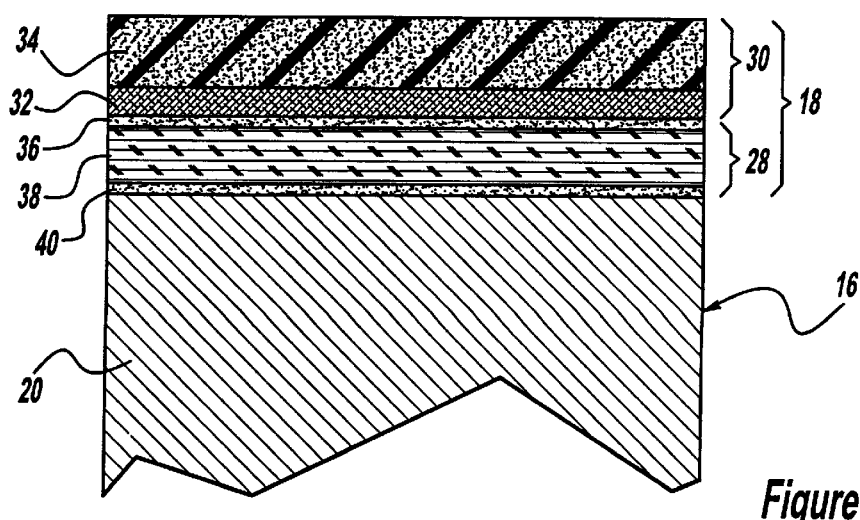
FIG. 3 is an enlarged partial view of FIG. 2.

Carrier strip 28 is provided to perform the function of maintaining a strong adhesive bond with body segment 20 of roll 16 while establishing a permanent and intimate bond with adhesive layer 36 of cover strip 30. As shown in FIG. 5, carrier strip 28 includes a base layer 38 and an adhesive layer 40. Base layer 38 is made of a friable material such as, for example, rolled paper, short fiber webbings, non-textured webbing of cotton, wool or synthetic, thin short fiber cloth of cotton, wool or synthetic fiber, or the like. Adhesive layer 40 is adapted to permanently bond carrier strip 28 to body segment 20 of roll 16 in such a manner to inhibit delamination of carrier strip 28 from roll 16 during use and during the process of stripping cover strip 30 from carrier strip 28.

As noted, adhesive layer 36 on cover strip 30 functions to bond cover strip 30 to the outermost surface of base layer 38 of carrier strip 28. Adhesive layer 36 establishes a strong mechanical interface such that the cross-sectional contact between substrate layer 32 of cover strip 30 and friable base layer 38 of carrier strip 28 approaches 100% thereby resulting in minimal mobility at the interface. When replacement of cover strip 30 is desired, the adhesive bond between cover strip 30 and carrier strip 28 is broken such as by peeling or stripping of cover strip 30. Thereafter, the worn-out cover strip 30 is discarded. However, the adhesive joint between the outermost surface of base layer 38 and adhesive layer 36 causes a thin film or skin of friable material from base layer 38 to be released (i.e., peeled, delaminated, sloughed-off, shed, etc.) and pulled away with cover strip 30. As such, a new surface of friable material of base layer 38 is exposed to which adhesive layer 36 of a replacement cover strip 30 will be adhesively bonded. Thus, base layer 38 acts as foundation for multiple replacements of cover strips 30 until enough friable material has been shed or sloughed-off to require removal of roll assembly 12 from conveyor 10 for reconditioning roll assembly 12. During such reconditioning, the old base layer is removed from body segment 20 of roll 16, and a new carrier strip 28 is adhesively secured to roll 16, as previously described. Both cover strips 30 and carrier strips 28 can be fabricated as sheets for coaxial mounting on roll 16 or, in the alternative, can be fabricated in rolls of material that are wound in a spiral manner to cover the work areas of roll 16. As an alternative, cover strip 30 may be laminated to the carrier strip 28 during the manufacturing process to define a one-piece roll covering 18 used to expedite the first installation of roll covering 18 on roll 16.

From the foregoing description, it should be appreciated that the replaceable covering system provides improved cross-sectional contact at the interface between the replaceable outer strip (i.e., cover strip 30) and the underlying mounting strip (i.e., carrier strip 28). As a result, the replaceable covering is able to resist heavy weights and high pressure during functional operation without deforming or destruction of the bond interface. Additionally, cover strip 30 may be removed and replaced quickly and inexpensively when worn down without the necessity for replacing carrier strip 28. Finally, the carrier strip 28 serves as a base for multiple replacements of cover strip 30 before the necessity for replacing the carrier strip 28 arises.

Those skilled in the art can now appreciate the foregoing description that the broad teachings of the present invention can be implemented in a variety of forms. Therefore, while this invention has been described in connection with particular examples thereof, the true scope of the invention should not be limited since other modifications will become apparent to the skilled practitioner upon a study of the drawings, specification and following claims.

What is claimed is:

1. A method for forming a replaceable covering for a member comprising the steps of:

providing a carrier strip having a friable layer and an adhesive layer;

bonding said adhesive layer of said carrier strip to the member;

providing a cover strip having a substrate layer, a cover layer and an adhesive layer bonded to opposite sides of said substrate layer; and bonding said adhesive layer of said cover strip to said friable surface of said carrier strip.

2. The method of claim 1 wherein the member is a roller.

3. The method of claim 1 wherein said cover layer is one of rubber, urethane, polyester, vinyl, synthetic rubber, mixture of synthetic fibers, fiberglass and light gauge metal.

4. The method of claim 1 wherein said friable layer is one of non-textured webbing of cotton, wool and synthetic fiber.

5. The method of claim 1 wherein said friable layer is one of thin short fiber cloth of cotton, wool and synthetic fiber.

6. The method of claim 1 wherein said adhesive layer of said carrier strip is one of acrylic grade 1 and one part epoxy.

7. The method of claim 1 further comprising the steps of:

stripping said cover strip from said carrier strip such that a portion of said friable layer is released with said cover strip; and bonding said adhesive layer of a second cover strip to said exposed surface of said friable layer.

8. A replaceable covering for a roll comprising:
- a carrier strip having a friable layer adapted to be secured to the roll; and
- a cover strip having a cover layer secured to one side of a substrate layer and an adhesive layer secured to the opposite side of said substrate layer, said adhesive layer adapted to be bonded to said friable layer.

9. The replaceable covering of claim 8 wherein said friable layer is secured to the roll by an adhesive.

10. The replaceable covering of claim 8 wherein said cover layer is one of rubber, urethane, polyester, vinyl, synthetic rubber, mixture of synthetic fibers, fiberglass and light gauge metal.

11. The replaceable covering of claim 8 wherein said friable layer is one of non-textured webbing of cotton, wool and synthetic fiber.

12. The replaceable covering of claim 8 wherein said friable layer is one of thin short fiber cloth of cotton, wool and synthetic fiber.

13. The replaceable covering of claim 8 wherein the cross-sectional interface between said adhesive layer and said friable layer is substantially 100%.

14. The replaceable covering of claim 8 wherein said adhesive layer is one of acrylic grade 1 and one part epoxy.

15. The replaceable covering of claim 8 wherein said cover layer is adhesively bonded to said substrate layer.

16. A roll assembly comprising:
- a roll;
- a carrier strip having a friable layer secured to said roll; and
- a cover layer having a substrate layer laminated to said friable layer of said carrier strip and a cover layer laminated to said substrate layer.

17. The roll assembly of claim 15 wherein removal of said cover strip from said friable layer causes a portion of said friable layer to be released therewith to expose a new surface, and wherein a replacement cover layer can be laminated to said new surface of said friable layer.

18. The roll assembly of claim 15 wherein the cross-sectional interface between said layers is substantially 100%.

* * * * *